US008554850B2

(12) United States Patent
Yanagi

(10) Patent No.: US 8,554,850 B2
(45) Date of Patent: Oct. 8, 2013

(54) MULTI-FUNCTION DEVICE

(75) Inventor: Satoru Yanagi, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 274 days.

(21) Appl. No.: 12/859,171

(22) Filed: Aug. 18, 2010

(65) Prior Publication Data

US 2011/0078261 A1 Mar. 31, 2011

(30) Foreign Application Priority Data

Sep. 28, 2009 (JP) .................................. 2009-223516

(51) Int. Cl.
*G06F 15/16* (2006.01)

(52) U.S. Cl.
USPC ........................................................ 709/206

(58) Field of Classification Search
USPC ........................................................ 709/206
See application file for complete search history.

(56) References Cited

U.S. PATENT DOCUMENTS

| 6,327,612 | B1 | 12/2001 | Watanabe | |
| 6,993,562 | B2* | 1/2006 | Treptow et al. | 709/206 |
| 7,136,180 | B2* | 11/2006 | Utsunomiya | 358/1.15 |
| 7,847,962 | B2* | 12/2010 | Yorimoto et al. | 358/1.15 |
| 8,179,549 | B1* | 5/2012 | Evans | 358/1.15 |
| 2002/0019851 | A1* | 2/2002 | Pollack | 709/206 |
| 2002/0049819 | A1* | 4/2002 | Matsuda et al. | 709/206 |
| 2002/0051183 | A1* | 5/2002 | Tsukui et al. | 358/1.15 |
| 2002/0143924 | A1* | 10/2002 | Iga | 709/223 |
| 2003/0063309 | A1* | 4/2003 | Parry | 358/1.15 |
| 2003/0107762 | A1* | 6/2003 | Kinoshita et al. | 358/1.15 |
| 2003/0107776 | A1 | 6/2003 | Maeda | |
| 2003/0135571 | A1* | 7/2003 | Sato | 709/206 |
| 2003/0182378 | A1* | 9/2003 | Treptow et al. | 709/206 |
| 2003/0187939 | A1* | 10/2003 | O'Brien | 709/206 |
| 2003/0233411 | A1* | 12/2003 | Parry et al. | 709/206 |
| 2004/0184060 | A1* | 9/2004 | Nathan | 358/1.13 |
| 2005/0010646 | A1* | 1/2005 | Shiina | 709/207 |
| 2006/0047765 | A1* | 3/2006 | Mizoi et al. | 709/206 |

(Continued)

FOREIGN PATENT DOCUMENTS

| CN | 1342013 A | 3/2002 |
| CN | 101520829 A | 9/2009 |

(Continued)

OTHER PUBLICATIONS

Namtuk. "Automatic Print Email". Jul. 5, 2008. http://www.automatic-print-email.com/ pp. 1-3.*

(Continued)

*Primary Examiner* — Imad Hussain
(74) *Attorney, Agent, or Firm* — Baker Botts L.L.P.

(57) ABSTRACT

A multi-function device may be configured to receive a first electronic mail including a first attached file, analyze the first electronic mail, supply an image described by the first attached file to a print performing unit in a case where the multi-function device analyzes that the first electronic mail includes first command information including a first sort of a command and first designation information designating the first attached file, and send the first attached file to an other device in a case where the multi-function device analyzes that the first electronic mail includes second command information including a second sort of a command different from the first sort of the command and the first designation information.

8 Claims, 5 Drawing Sheets

(56) References Cited

U.S. PATENT DOCUMENTS

| | | |
|---|---|---|
| 2006/0168072 A1* | 7/2006 | Park .......................... 709/206 |
| 2006/0242247 A1* | 10/2006 | Richardson ................ 709/206 |
| 2008/0259393 A1 | 10/2008 | Iura et al. |
| 2010/0053667 A1* | 3/2010 | Honda ....................... 358/1.15 |
| 2010/0182632 A1* | 7/2010 | Wu et al. ................... 358/1.15 |
| 2012/0188600 A1* | 7/2012 | Oshima et al. ............. 358/1.15 |

FOREIGN PATENT DOCUMENTS

| | | |
|---|---|---|
| EP | 0923226 A1 | 6/1999 |
| EP | 2096531 A2 | 9/2009 |
| JP | H11-212884 A | 8/1999 |
| JP | H11-252301 A | 9/1999 |
| JP | 2000-339239 A | 12/2000 |
| JP | 2004-178082 A | 6/2004 |

OTHER PUBLICATIONS

European Patent Office, extended European Search Report for European Patent Application No. 10007940.9 (counterpart to above-captioned patent application), dated Dec. 29, 2011.

The State Intellectual Property Office of the People's Republic of China, Notification of the First Office Action for Chinese Patent Application No. 201010297247.6 (counterpart Chinese patent application), issued Sep. 11, 2012.

Japan Patent Office, Notification of Reasons for Rejection for Japanese Patent Application No. 2009-223516, mailed Jun. 25, 2013.

State Intellectual Property Office of the People's Republic of China, Notification of the Second Office Action for Chinese Patent Application No. 201010297247.6, mailed May 29, 2013.

* cited by examiner

MULTI-FUNCTION DEVICE

CROSS-REFERENCE TO RELATED APPLICATIONS

This application claims priority to Japanese Patent Application No. 2009-223516, filed on Sep. 28, 2009, the contents of which are hereby incorporated by reference into the present application.

TECHNICAL FIELD

The present specification discloses a multi-function device comprising an electronic mail communication function and a print function.

DESCRIPTION OF RELATED ART

An Internet facsimile device (multi-function device) comprising an electronic mail communication function and a print function is known. If a received electronic mail includes an attached file, the Internet facsimile device performs print process to an image described by the attached file.

SUMMARY

There are cases where a sender of the electronic mail wishes for a multi-function device to perform the print process to the attached file included in the electronic mail, and there are cases where the sender of the electronic mail wishes for the multi-function device to perform processes other than the print process to the attached file included in the electronic mail. This specification discloses a multi-function device that is capable of performing the process that is desired by the sender of the electronic mail to the attached file included in the received electronic mail.

This specification discloses a multi-function device comprising an electronic mail communication function and a print function. The multi-function device may comprise a receiving unit, an analyzing unit, a supplying unit and a file sending unit. The receiving unit may be configured to receive a first electronic mail including a first attached file. The analyzing unit may be configured to analyze the first electronic mail. The supplying unit may be configured to supply an image described by the first attached file to a print performing unit in a case where the analyzing unit analyzes that the first electronic mail includes first command information including a first sort of a command and first designation information designating the first attached file. The file sending unit may be configured to send the first attached file to an other device in a case where the analyzing unit analyzes that the first electronic mail includes second command information including a second sort of a command different from the first sort of the command and the first designation information.

Incidentally, the control method, computer program and non-transitory recording medium storing such computer program for realizing the multi-function device are also novel and useful. Moreover, the system comprising the multi-function device and the device that is capable of communicating electronic mails with the multi-function device is also novel and useful.

EMBODIMENT (Configuration of Communication System 2)

Figure 1:
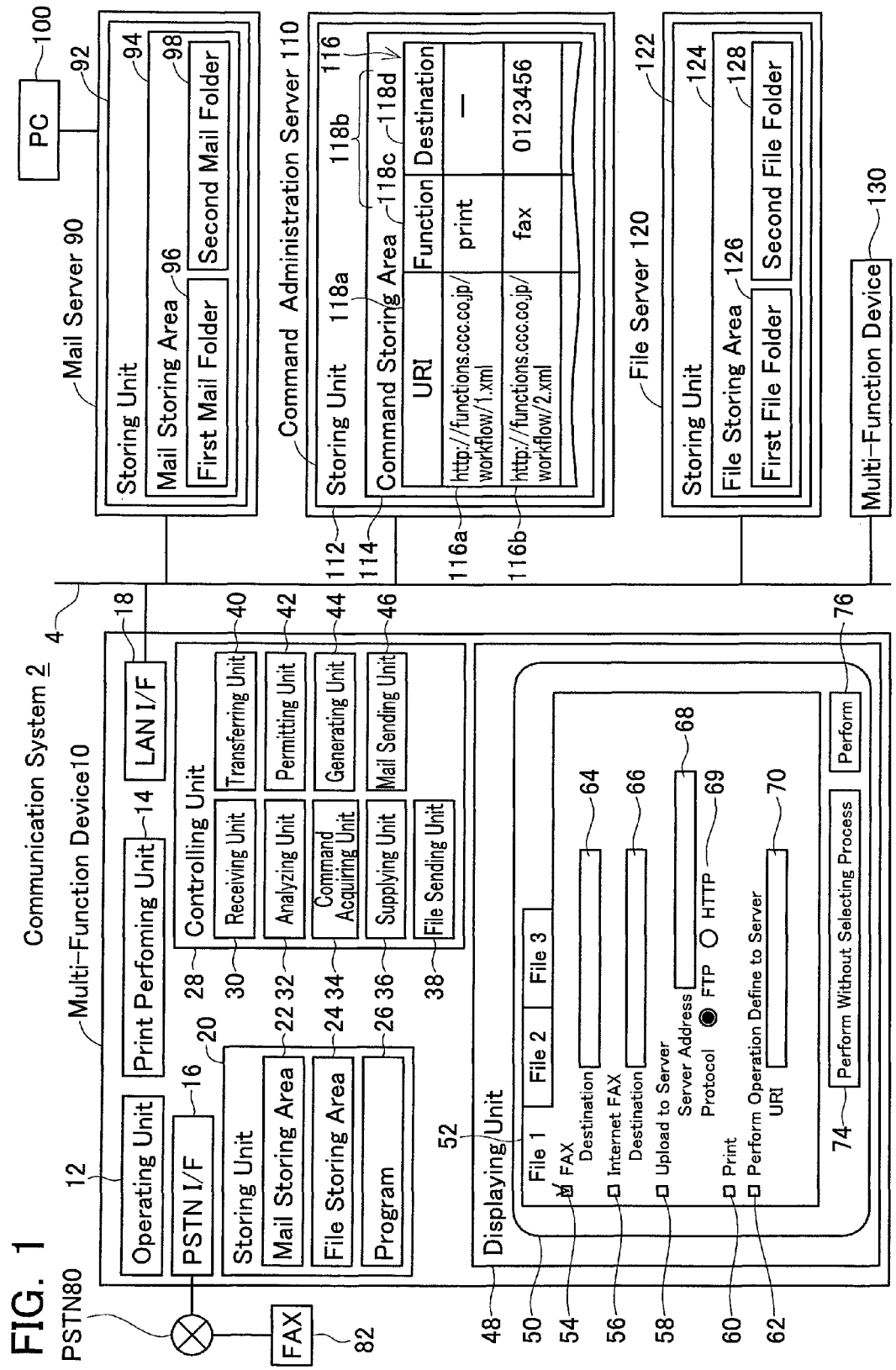
FIG. 1 shows an example of a configuration of a communication system.

An embodiment is now explained with reference to the drawings. As shown in FIG. 1, a communication system 2 comprises a multi-function device 10, a facsimile device (hereinafter abbreviated as "FAX" in the drawings and the ensuing explanation) 82, a mail server 90, a PC 100, a command administration server 110, a file server 120, and a multi-function device 130. The multi-function device 10 is communicably connected to the FAX 82 via a PSTN (Public Switched Telephone Network) 80. The multi-function device 10 is also communicably connected to the respective devices 90, 110, 120, 130 via a LAN 4. Incidentally, there is no limitation in the number of FAXes, PCs, and multi-function devices that configure the communication system 2. Moreover, the LAN 4 may be a wireless LAN or a wired LAN.

(Configuration of Multi-Function Device 10)

The multi-function device 10 comprises an operating unit 12, a print performing unit 14, a PSTN interface (hereinafter abbreviated as "PSTN I/F" in the drawings and the ensuing explanation) 16, a LAN interface (hereinafter abbreviated as "LAN I/F" in the drawings and the ensuing explanation) 18, a storing unit 20, a controlling unit 28, a displaying unit 48, and so on.

The operating unit 12 comprises a plurality of keys (e.g., a numerical keypad and a start key). A user may cause the multi-function device 10 to perform various processes by operating the operating unit 12. The print performing unit 14 comprises an inkjet head. The print performing unit 14 prints the image supplied from a supplying unit 36 described later on a print medium such as paper. The PSTN I/F 16 is an interface for communicating with an external device (e.g., the FAX 82) via the PSTN 80. The LAN I/F 18 is an interface for communicating with an external device (e.g., the respective devices 90, 110, 120, 130) via the LAN 4.

The storing unit 20 comprises a mail storing area 22, a file storing area 24, and so on. The mail storing area 22 temporarily stores the electronic mail received from the mail server 90. The file storing area 24 stores data files. For example, the file storing area 24 stores data files that were created by a scanner unit (not shown) scanning documents and the like, and data files that were received from an external device. The storing unit 20 additionally stores a program 26. The program 26 includes a basic function program for performing the basic functions of the multi-function device 10 such as the print process, display process, electronic mail communication process, and other processes.

The controlling unit 28 is configured from a CPU (not shown). The controlling unit 28 performs various processes according to the program 26 stored in the storing unit 20. As a result of the controlling unit 28 performing the processes according to the program 26, the functions of a receiving unit 30, an analyzing unit 32, a command acquiring unit 34, a supplying unit 36, a file sending unit 38, a transferring unit 40, a permitting unit 42, a generating unit 44 and a mail sending unit 46 are realized.

The displaying unit 48 is a display for displaying various types of information including a process selection screen 50 described later.

(Configuration of Mail Server 90)

The mail server 90 relays the communication of electronic mails between the devices (e.g., the multi-function device 10 and the PC 100) that are communicably connected to itself. For example, in a case where the PC 100 that is communicably connected to the mail server 90 is to send an electronic mail upon designating the multi-function device 10 as the destination, the electronic mail sent from the PC 100 is received by the mail server 90. The mail server 90 stores the received electronic mail in a first mail folder 96 of a mail storing area 94 described later. The multi-function device 10 receives the electronic mail stored in the first mail folder 96. The mail server 90 comprises a storing unit 92. The storing unit 92 comprises a mail storing area 94. The mail storing area 94 comprises the first mail folder 96 and a second mail folder 98. The first mail folder 96 stores electronic mails in which the multi-function device 10 is designated as the destination. The second mail folder 98 stores electronic mails that is transferred from the first mail folder 96 as a result of the multi-function device 10 performing an electronic mail analyzing process (refer to FIG. 3) described later. The solid line between the mail server 90 and the PC 100 shows that the mail server 90 and the PC 100 are communicably connected. The mail server 90 and the PC 100 may be connected by wire or connected wirelessly. Incidentally, the PC 100 may be a desktop PC, a laptop PC, or a portable terminal.

The mail server 90 uses IMAP (Internet Message Access Protocol) to perform the communication of electronic mails. With the mail server 90, the electronic mails stored in the first mail folder 96 will not be erased from the first mail folder 96 even when they are received by the multi-function device 10. By communicating with the mail server 90, the multi-function device 10 may erase the electronic mails stored in the first mail folder 96, transfer the electronic mails stored in the first mail folder 96 to a different mail folder (e.g., the second mail folder 98), newly create a mail folder in the mail storing area 94, delete the mail folder of the mail storing area 94, and so on.

(Configuration of Command Administration Server 110)

The command administration server 110 is communicably connected to the multi-function device 10 via the LAN 4. The command administration server 110 comprises a storing unit 112. The storing unit 112 comprises a command storing area 114. The command storing area 114 stores a command list 116 capable of recording a plurality of pieces of combination information 116a, 116b. The command list 116 is used by the multi-function device 10 when the multi-function device 10 performs the electronic mail analyzing process described later (refer to FIG. 3). Each piece of combination information 116a, 116b is information in which a URI (Uniform Resource Identifier) 118a and a command combination 118b are associated. The URI 118a is identification information for identifying the command combination 118b. In the command combination 118b, a Function 118c, a Destination 118d and the like are associated. The Function 118c records commands to be performed by the multi-function device 10. The Destination 118d records destination information in cases where the multi-function device 10 sends data files to another device according to the Function 118c.

(Configuration of File Server 120)

The file server 120 is communicably connected to the multi-function device 10 via the LAN 4. The file server 120 comprises a storing unit 122. The storing unit 122 comprises a file storing area 124. The file storing area 124 comprises a first file folder 126 and a second file folder 128. The respective file folders 126, 128 may store data files.

(Configuration of Multi-Function Device 130)

The multi-function device 130 comprises the same configuration as the multi-function device 10.

(Processes Performed by Multi-Function Device 10)

Figure 2:
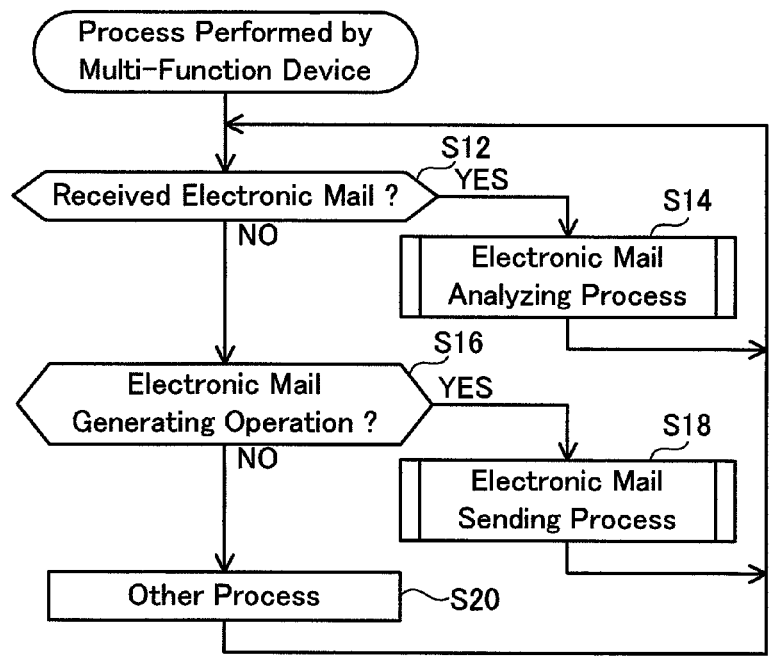
FIG. 2 shows a flowchart of a process that is performed by a multi-function device.

The processes performed by the multi-function device 10 are now explained in detail. As shown in FIG. 2, the receiving unit 30 of the multi-function device 10 monitors the reception of electronic mails (S12). Specifically, when the user performs prescribed operations with the operating unit 12, the receiving unit 30 communicates with the mail server 90 and determines whether an electronic mail is stored in the first mail folder 96 of the mail server 90. If the foregoing prescribed operations are not performed, the receiving unit 30 communicates with the mail server 90 at predetermined intervals and determines whether an electronic mail is stored in the first mail folder 96. If an electronic mail is stored in the first mail folder 96, the receiving unit 30 receives such electronic mail (YES at S12). If the determination is YES at S12, the receiving unit 30 temporarily stores the received electronic mail (electronic mail 200) in the mail storing area 22. Meanwhile, if an electronic mail is not stored in the first mail folder 96, the receiving unit 30 does not receive an electronic mail (NO at S12).

If the determination is YES at S12, the controlling unit 28 performs an electronic mail analyzing process (S14), and returns to S12. If the determination is NO at S12, the generating unit 44 monitors whether an operation described later for causing the multi-function device 10 to generate an electronic mail has been performed by the user with the operating unit 12 (S16). If the determination is YES at S16, the controlling unit 28 performs an electronic mail sending process (S18), and returns to S12. If the determination is NO at S16, the controlling unit 28 performs other processes corresponding to the operation performed by the user with the operating unit 12 or signals received via the LAN 4 (S20), and returns to S12.

(Electronic Mail Analyzing Process)

The electronic mail analyzing process that is performed at S14 of FIG. 2 is now explained in detail. In this embodiment, the PC 100 is the sending device of the electronic mail 200 that was received by the receiving unit 30.

Figure 4:
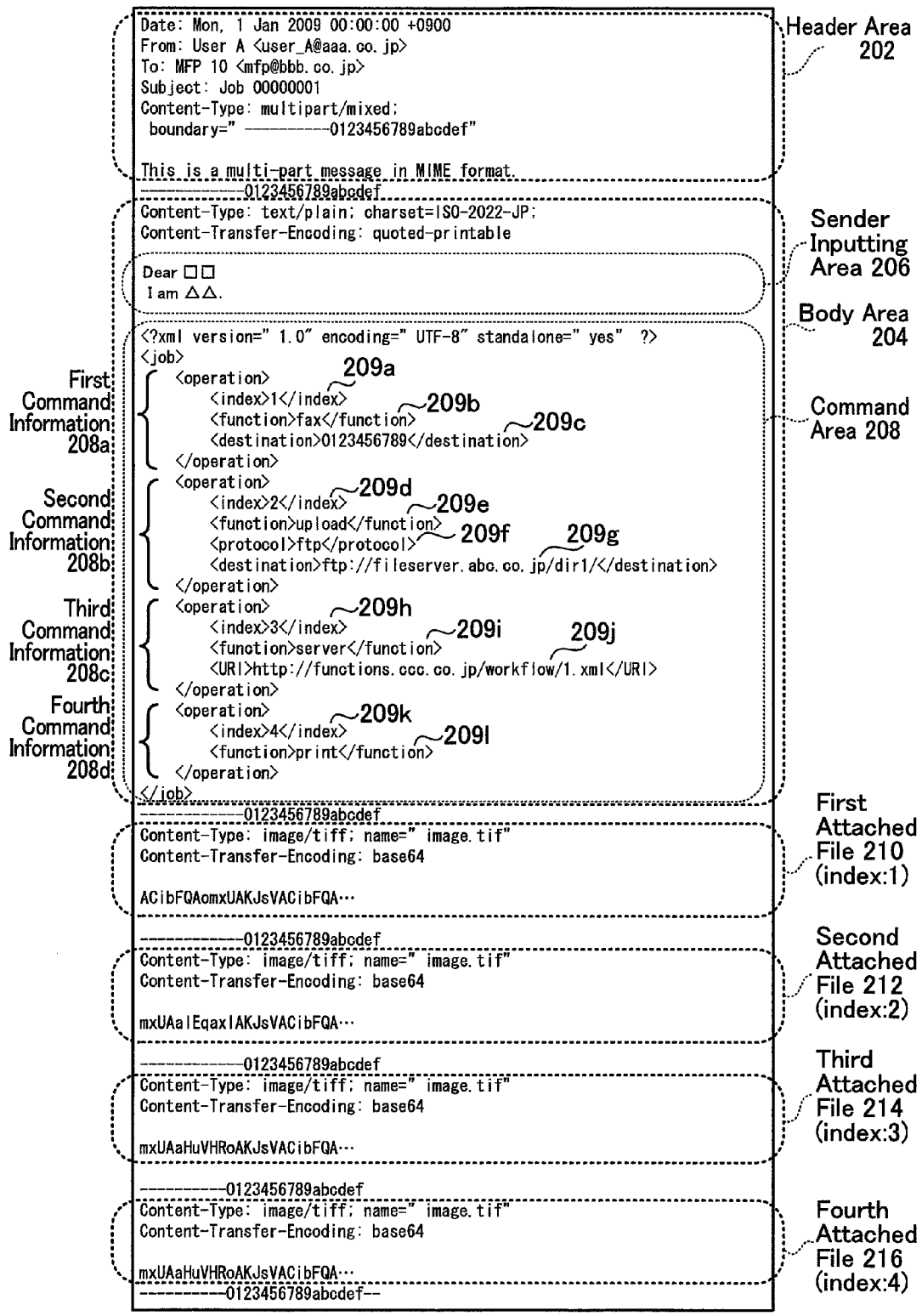
FIG. 4 shows an example of a configuration of the electronic mail that is received by the multi-function device.

The configuration of the electronic mail 200 is foremost explained. As shown in FIG. 4, the electronic mail 200 comprises a header area 202, a body area 204, and attached files 210 to 216. The header area 202 includes the date and time that the electronic mail 200 was sent, sender information (name of sender of the electronic mail 200, electronic mail address of the PC 100, and so on), destination information (device name of the multi-function device 10, electronic mail address, and so on), and the like. The body area 204 includes a sender inputting area 206 and a command area 208. The sender inputting area 206 includes a text that was input by the sender of the electronic mail 200. The command area 208 includes four pieces of command information 208a to 208d. Each piece of command information 208a to 208d is information that is described in the area from the line indicated with <operation> to the line indicated with </operation>. The first command information 208a includes designation information 209a that designates the attached file, a command 209b, and destination information 209c showing the destination of the attached file. The second command information 208b includes designation information 209d that designates the attached file, a command 209e, protocol information 209f, and destination information 209g showing the destination of the attached file. The third command information 208c includes designation information 209h that designates the attached file, a command 209i, and identification information 209j. The fourth command information 208d includes designation information 209k that designates the attached file, and a command 209l.

Figure 3:
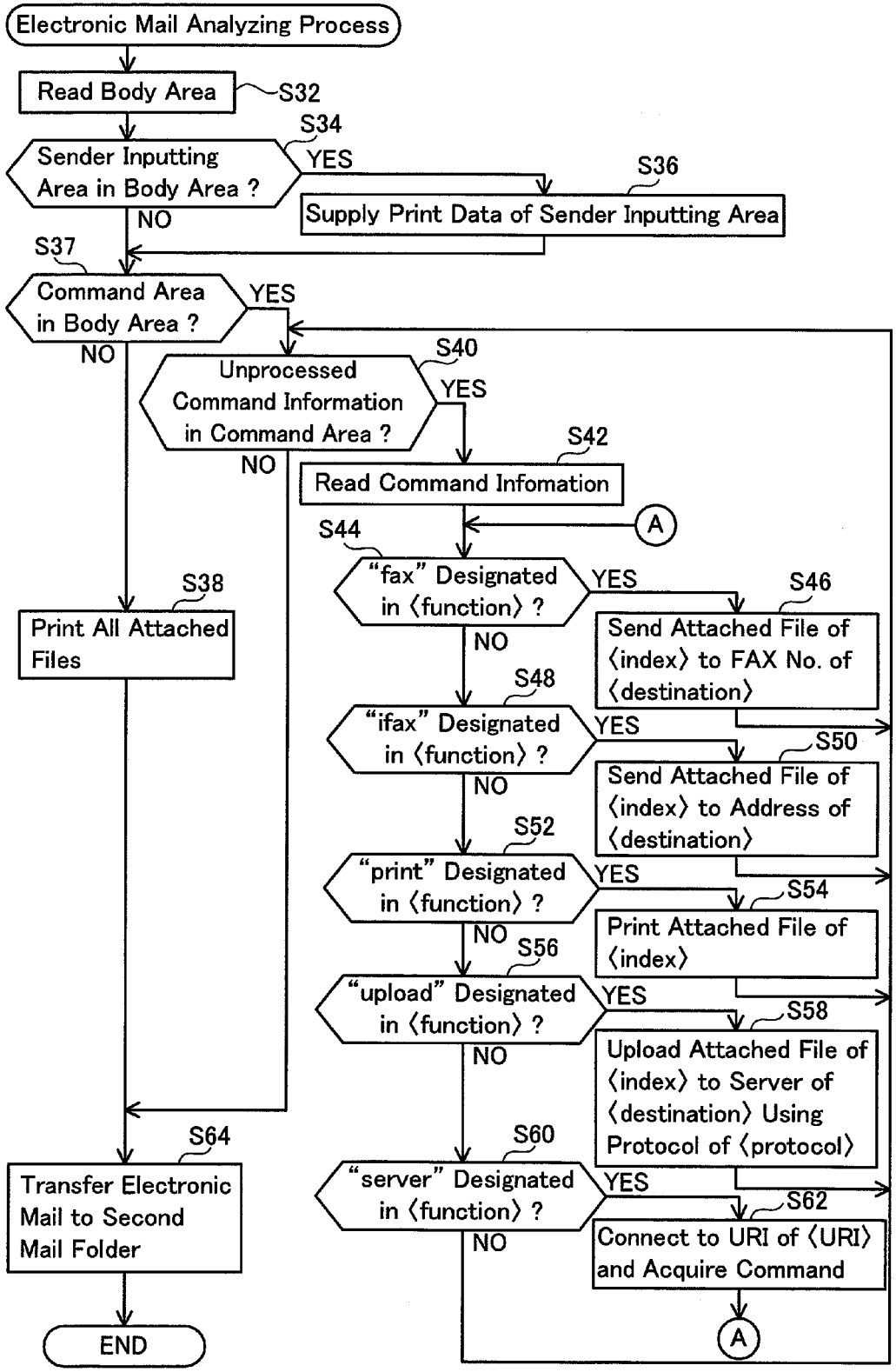
FIG. 3 shows a flowchart of an electronic mail analyzing process that is performed by the multi-function device.

As shown in FIG. 3, the analyzing unit 32 (refer to FIG. 1) of the multi-function device 10 analyzes the electronic mail 200 that was received at S12 of FIG. 2, and reads the body area 204 (S32). Subsequently, the analyzing unit 32 determines whether the sender inputting area 206 is included in the body area 204 (S34). The analyzing unit 32 determines that the sender inputting area 206 is included (YES at S34) in a case where text is described in the area between the line indicated with "Content-Transfer-Encoding . . ." and the line indicated with "<?xml version="1.0" . . . " which are included in the body area 204. Otherwise, if "<?xml version="1.0" . . . " is not indicated in the body area 204, the analyzing unit 32 determines that the sender inputting area 206 is included (YES at S34) in a case where text is described in the area between the line indicated with "Content-Transfer-Encoding" and the line indicated with the attached file. Meanwhile, if text is not described in the foregoing areas, the analyzing unit 32 determines that the sender inputting area 206 is not included (NO at S34).

If the determination is NO at S34, the routine proceeds to S37. Meanwhile, if the determination is YES at S34, the supplying unit 36 (refer to FIG. 1) of the multi-function device 10 supplies print data corresponding to the text described in the sender inputting area 206 to the print performing unit 14 (refer to FIG. 1) of the multi-function device 10 (S36), and proceeds to S37. The print performing unit 14 performs printing on the paper that is set in the multi-function device 10 based on the print data. At S37, the analyzing unit 32 determines whether the command area 208 is included in the body area 204. In this embodiment, the analyzing unit 32 determines that the command area 208 is included (YES at S37) in a case where "<?xml version="1.0" . . ." is described in the area between the line indicated with "Content-Transfer-Encoding . . ." and the line indicated with the attached file, and determines that the command area 208 is not included (NO at S37) when the "<?xml version="1.0" . . . " is not described.

If the determination is NO at S37, the supplying unit 36 supplies the images described by all attached files 210 to 216 that are attached to the electronic mail 200 to the print performing unit 14 (S38), and proceeds to S64. The print performing unit 14 prints the supplied images on paper. Meanwhile, if the determination is YES at S37, the analyzing unit 32 reads and analyzes each piece of command information 208a to 208d included in the command area 208 in the order that they were described in the command area 208.

The analyzing unit 32 determines whether command information that has not been read; that is, command information that has not been performed by the multi-function device 10, is included in the command area 208 (S40). If the determination is YES at S40, the analyzing unit 32 reads the command information that was described at the uppermost part among the command information that has not yet been processed (S42). Subsequently, the analyzing unit 32 determines whether "fax" is designated in the command included in the read command information; that is, whether "<function>fax" is described in the command information (S44). In this embodiment, if the first command information 208a is read at S42, the analyzing unit 32 determines YES at S44. If the determination is YES at S44, the file sending unit 38 (refer to FIG. 1) of the multi-function device 10 sends the first attached file 210 designated with the designation information 209a included in the first command information 208a to the FAX (e.g., FAX 82) corresponding to the facsimile number designated with the destination information 209c included in the first command information 208a (S46).

If the determination is NO at S44, the analyzing unit 32 determines whether "ifax" is designated in the command; that is, whether "<function>ifax" is described in the command information (S48). If the determination is YES at S48, the file sending unit 38 sends the attached file designated with the designation information included in the command information to the device (e.g., the multi-function device 130) corresponding to the address designated with the destination information included in the command information (S50).

If the determination is NO at S48, the analyzing unit 32 determines whether "print" is designated in the command; that is, whether "<function>print" is described in the command information (S52). In this embodiment, if the fourth command information 208d is read at S42, the analyzing unit 32 determines YES at S52. If the determination is YES at S52, the supplying unit 36 supplies the image described by the fourth attached file 216 designated with the designation information 209k included in the fourth command information 208d to the print performing unit 14 (S54). The print performing unit 14 prints the supplied image on paper.

If the determination is NO at S52, the analyzing unit 32 determines whether "upload" is designated in the command; that is, whether "<function>upload" is described in the command information (S56). In this embodiment, if the second command information 208b is read at S42, the analyzing unit 32 determines YES at S56. If the determination is YES at S56, the file sending unit 38 uploads the second attached file 212 designated with the designation information 209d included in the second command information 208b to the folder (first file folder 126 or second file folder 128) of the file server 120 corresponding to the address designated with the destination information 209g included in the second command information 208b (S58). The file sending unit 38 uses the protocol designated with the protocol information 209f to upload the second attached file 212 to the file server 120.

If the determination is NO at S56, the analyzing unit 32 determines whether "server" is designated in the command; that is, whether "<function>server" is described in the command information (S60). In this embodiment, if the third command information 208c is read at S42, the analyzing unit 32 determines YES at S60. If the determination is YES at S60, the command acquiring unit 34 (refer to FIG. 1) of the multi-function device 10 acquires, from the command administration server 110, the command combination 118b that is associated with the identification information 209j included in the third command information 208c (S62), and returns to S44. Specifically, the command acquiring unit 34 accesses the combination information 116b of the command administration server 110 indicated with the URI designated with the identification information 209j, and acquires the associated command combination 118b.

In the process to be performed subsequent to S62, the analyzing unit 32 analyzes the command combination 118b acquired from the command administration server 110. Here, the case where the command acquiring unit 34 acquires the command combination 118b included in the combination information 116a at S62 is foremost explained. Next, the case where the command acquiring unit 34 acquires the command combination 118b included in the combination information 116b at S62 is explained. If the command combination 118b included in the combination information 116a is acquired, the analyzing unit 32 determines that "print" is designated in the Function 118c of the command combination 118b (NO at S44 and S48, YES at S52). Subsequently, the supplying unit 36 supplies the image of the third attached file 214 designated with the designation information 209h included in the third command information 208d to the print performing unit 14 (S54).

If the command combination 118b included in the combination information 116b is acquired, the analyzing unit 32 determines that "fax" is designated in the Function 118c of the command combination 118b (YES at S44). In the foregoing case, the file sending unit 38 sends the third attached file 214 designated with the designation information 209h included in the third command information 208d to the FAX (e.g., the FAX 82) corresponding to the facsimile number designated with the destination 118c (S46).

When all command information 208a to 208d included in the electronic mail 200 is processed, the analyzing unit 32 determines NO at S40, and proceeds to S64. At S64, the transferring unit 40 (refer to FIG. 1) of the multi-function device 10 transfers the electronic mail 200 stored in the first mail folder 96 of the mail server 90 to the second mail folder 98, and ends the process. Specifically, the transferring unit 40 erases the electronic mail 200 stored in the first mail folder 96 and stores the electronic mail 200 in the second mail folder 98. Here, the transferring unit 40 erases the electronic mail 200 stored in the mail storing area 22.

(Electronic Mail Sending Process)

The electronic mail sending process that is performed by the controlling unit 28 of the multi-function device 10 is now explained in detail. The operation to be performed by the user with the operating unit 12 for generating an electronic mail at S16 of FIG. 2 is foremost explained. The user foremost performs a prescribed operation with the operating unit 12 (e.g., operating the mail generation key provided to the operating unit 12) in order to cause the multi-function device 10 to generate an electronic mail. When the foregoing prescribed operation is performed by the user using the operating unit 12, the permitting unit 42 (refer to FIG. 1) of the multi-function device 10 permits the user to select the data file. Specifically, when the foregoing prescribed operation is performed, the permitting unit 42 displays, on the displaying unit 48 of the multi-function device 10, the list of file names corresponding to the data files stored in the file storing area 24 (refer to FIG. 1) of the multi-function device 10, the list of files names corresponding to the data files stored in the first file folder 126 of the file server 120, and the list of file names corresponding to the data files stored in the second file folder 128. By operating the operating unit 12, the user may select the file name corresponding to the desired data file to be attached to the electronic mail from the lists displayed on the displaying unit 48. The user thereby may select the data file to be attached to the electronic mail. The permitting unit 42 may also permit the user to select the multi-function device 10 performing the scan process. In the foregoing case, the permitting unit 42 determines that the data file created by the scan process has been selected by the user. When the data file is selected by the user, the permitting unit 42 stores the file identifying information of the selected data file (e.g., position information and file name showing the area or the like where the file is stored) in a prescribed storing area of the storing unit 20 (refer to FIG. 1) of the multi-function device 10.

When the user selects the data file to be attached to the electronic mail, the permitting unit 42 displays the process selection screen 50 (refer to FIG. 1) on the displaying unit 48. A case where the user selected three data files is explained below.

Among the three data files selected by the user, the permitting unit 42 permits the user to select the data file for which the process is to be selected. Specifically, the permitting unit 42 displays, on the process selection screen 50, three tabs 52 displaying the file names of the selected three data files. The permitting unit 42 permits the user to select one tab 52 among the three tabs 52. By operating the operating unit 12, the user may select one tab 52 among the three tabs 52. When one tab 52 is selected by the user, the permitting unit 42 permits the user to select a process for the data file corresponding to the file name that is displayed on the selected tab 52.

The permitting unit 42 permits the user to select one process among a plurality of processes 54, 56, 58, 60, 62 displayed on the process selection screen 50. By operating the operating unit 12, the user may select one process among the processes 54, 56, 58, 60, 62. If the process 54 is selected by the user, the permitting unit 42 permits the user to input the facsimile number of a facsimile destination of the data file in the input column 64. If the process 56 is selected by the user, the permitting unit 42 permits the user to input a destination address of the data file in the input column 66. If the process 58 is selected by the user, the permitting unit 42 permits the user to input a server address of a upload destination of the data file in the input column 68, and permits the user to select a protocol 69 to be used upon uploading the data file to the server. If the process 62 is selected by the user, the permitting unit 42 permits the user to input the URI of the command combination 118b to be acquired by the multi-function device of the electronic mail destination in the input column 70.

The permitting unit 42 also permits the user to select one of the buttons 74, 76. By operating the operating unit 12, the user is able to select one of the buttons 74, 76. If the button 74 is selected by the user, the permitting unit 42 determines that the user selected not to select a process for any of the selected three data files. Or, if the button 76 is selected by the user in a state where a process is not selected for any of the selected three data files, the permitting unit 42 determines that the user selected not to select a process for any of the plurality of data files. Moreover, if the button 76 is selected by the user in a state where the process for one or two data files is only selected among the selected three data files, the permitting unit 42 determines that the user selected not to select a process for the data file other than the data files for which the process was selected. If the user selects one of the buttons 74, 76, the permitting unit 42 permits the user to input destination information of the electronic mail to be generated in the electronic mail sending process described later. The permitting unit 42 stores, in a prescribed storing area of the storing unit 20, the combination information in which the foregoing file specifying information and the selection result of the process of the data file specified in the file specifying information are associated, and the destination information of the electronic mail.

The generating unit 44 thereafter specifies the data file that is specified by one piece of file specifying information among the three pieces of file specifying information stored in the storing unit 20 (S72). The generating unit 44 determines whether the process selection result is stored in the storing unit 20 upon being associated with the file specifying information of the specified data file (S74). If the determination is YES at S74, the generating unit 44 generates command information in the body area of the electronic mail according to the selected process (S76).

At S76, the generating unit 44 generates command information in which the file name corresponding to the data file specified at S72 is described in the designation information. Moreover, if the process 54 is selected by the user, the generating unit 44 generates command information in which "fax" is described in the command and the facsimile number input into the input column 64 is described in the destination information. If the process 56 is selected, the generating unit 44 generates command information in which "ifax" is described in the command, and the address input into the input column 66 is described in the destination information. If the process 58 is selected, the generating unit 44 generates command information in which "upload" is described in the command, the server address input into the input column 68 is described in the sending information, and the protocol selected by the user is described in the protocol information. If the process 60 is selected, the generating unit 44 generates command information in which "print" is described as the command. If the process 62 is selected, the generating unit 44 generates command information in which "server" is described in the command, and the URI input into the input column 70 is described in the destination information.

Meanwhile, if the determination is NO at S74, the generating unit 44 generates command information in which the file name corresponding to the data file specified at S72 is described in the designation information, and "print" is described in the command (S78), and proceeds to S80. At S80, the generating unit 44 determines whether there is a data file for which command information has not been generated among the data files selected by the user. If the determination is YES at S80, the routine returns to S72. If the determination is NO at S80, the generating unit 44 attaches the data file to the body area including the command information and creates an electronic mail (S82). Subsequently, the mail sending unit 46 sends the created electronic mail to the device corresponding to the destination address that was input by the user (S84), and ends the process.

The multi-function device 10 of this embodiment was explained in detail above. In this embodiment, the multi-function device 10 performs the processes (e.g., print process, facsimile communicating process, upload process to the file server 120 and so on) corresponding to the commands included in the command information 208*a* to 208*d* to the attached files 210 to 216 that are specified with the command information 208*a* to 208*d* included in the received electronic mail. According to the foregoing configuration, the multi-function device 10 may perform the appropriate process to the attached file included in the electronic mail. By sending the electronic mail 200 to the multi-function device 10, the user of the PC 100 as the sender of the electronic mail 200 may cause the multi-function device 10 to perform the process desired by the user of the PC 100 to the attached files 210 to 216.

Moreover, when the multi-function device 10 receives an electronic mail 200 including a plurality of attached files 210 to 216 and a plurality of pieces of command information 208*a* to 208*d* designating the plurality of attached files, it performs, to each of the attached files 210 to 216, the respective processes corresponding to the commands 209*b*, 209*e*, 209*i*, 209*l* included in the command information 208*a* to 208*d* designating such attached files. According to the foregoing configuration, if a plurality of attached files are included in one electronic mail, the multi-function device 10 may perform a different process to each of the plurality of attached files.

The third command information 208*c* of the electronic mail 200 includes a command 209*i* designating the "server." In the foregoing case, the command acquiring unit 34 of the multi-function device 10 acquires, from the command list 116 of the command administration server 110, the command combination 118*b* including the Function 118*c* that is associated with the identification information 209*j* included in the third command information 208*c*. According to the foregoing configuration, the multi-function device 10 may acquire the command combination 118*b* stored in the command administration server 110 and perform the processes according to the acquired command combination 118*b*. Furthermore, according to the foregoing configuration, the multi-function device 10 may acquire a particular command combination among a plurality of command combinations 118*a*, 118*b* stored in command the administration server 110.

The body area 204 of the electronic mail 200 includes the sender inputting area 206 and the command area 208. Described in the command area 208 is the command information 208*a* to 208*d* for causing the multi-function device 10 to perform the processes. Accordingly, in many cases, the user of the multi-function device 10 is not required to know the contents of the command area 208. Meanwhile, the sender inputting area 206 includes a message input by the sender of the electronic mail 200 for the user of the multi-function device 10. Thus, the user of the multi-function device 10 will want to know the contents of the sender inputting area 206. The supplying unit 36 of the multi-function device 10 supplies, of the sender inputting area 206 and the command area 208 included in the body area 204 of the electronic mail 200, the print data corresponding to the text described in the sender inputting area 206 to the print performing unit 14, and does not supply to the print performing unit 14 the print data corresponding to the text that is described in the command area 208 (S36 of FIG. 3). According to the foregoing configuration, the multi-function device 10 may print only the contents which the user wishes to know.

If a command area is not included in the electronic mail received by the multi-function device 10 (NO at S37 of FIG. 3), the supplying unit 36 of the multi-function device 10 supplies the attached file included in the electronic mail to the print performing unit 14 (S38 of FIG. 3). According to the foregoing configuration, if the sender of the electronic mail did not designate a process for the attached file, the multi-function device 10 may perform an appropriate process to the attached file.

If the multi-function device 10 performs the processes to all attached files 210 to 216 according to the command information 208*a* to 208*d* included in the electronic mail 200 (NO at S38 and S40 of FIG. 3), the transferring unit 40 of the multi-function device 10 transfers the electronic mail 200 included in the first mail folder 96 of the mail server 90 to the second mail folder 98 (S64 of FIG. 3). According to the foregoing configuration, the multi-function device 10 may sort the electronic mails that have not been processed and the electronic mails that have been processed in different folders and store them in the mail server 90.

Figure 5:
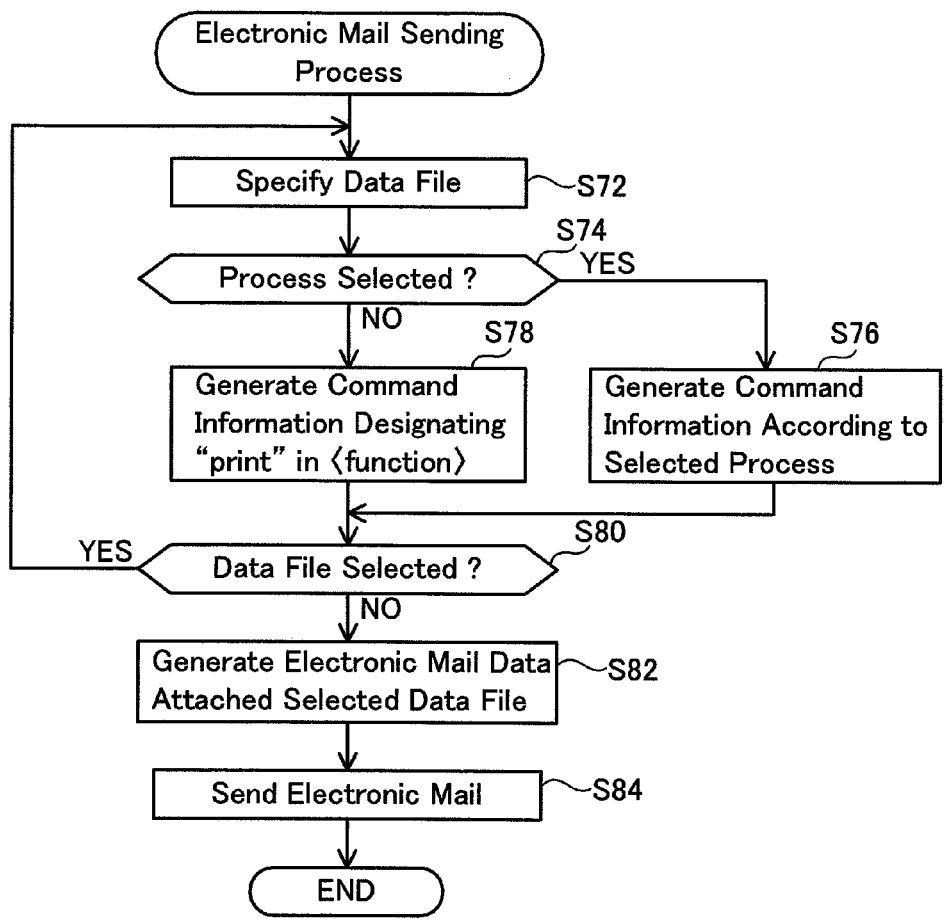
FIG. 5 shows a flowchart of an electronic mail sending process that is performed by the multi-function device.

The permitting unit 42 of the multi-function device 10 permits the user to select the data file, select a process for the selected data file, and input the destination information of the electronic mail. The generating unit 44 of the multi-function device 10 generates command information (S76 and S78 of FIG. 5), and generates an electronic mail including the generated command information (S82 of FIG. 5) based on the information input by the user. The mail sending unit 46 of the multi-function device 10 sends the generated electronic mail to the device corresponding to the destination information that was input by the user. According to the foregoing configuration, the user of the multi-function device 10 may use the multi-function device 10 and cause the destination device of the electronic mail to perform the appropriate process to the attached file that is attached to the electronic mail.

It is clear form above description, the command 209*l* is an example of the "first sort of command" and the fourth command information 208*b* is an example of the "first command information" and the "third command information." The commands 209*b*, 209*e* are examples of the "second sort of command" and the command information 208a, 208b is an example of the "second command information" and the "fourth command information." The command 209i is an example of the "third sort of command" and the third command information 208c is an example of the "fifth command information." The FAX 82, the file server 120 and the multi-function device 130 are examples of "another device." The Function 118c is an example of the "particular command." The URI 118a is an example of the "identification information." The identification information 209j is an example of the "particular identification information."

(Modified Examples)

(1) The storing unit 20 of the multi-function device 10 may store an association the command ("fax," "ifax," "upload") and the destination information. For example, if the command of the command information included in the electronic mail received by the multi-function device 10 is "fax" and the destination information (<destination>) is not included in that command information, the file sending unit 38 of the multi-function device 10 may send the data file designated with the command information to the device corresponding to the destination information which is associated with "fax" and stored in the storing unit 20. Similarly, if the command of the command information in the electronic mail received by the multi-function device 10 is "ifax" or "upload" and the destination information (<destination>) is not included in that command information, the file sending unit 38 may send the file designated with the command information to the device corresponding to the destination information which is associated with "ifax" or "upload" and stored in the storing unit 20.

(2) In the foregoing embodiment, the print performing unit 14 of the multi-function device 10 includes an inkjet head. However, as an alternative, a laser mechanism (photoreceptor, exposure unit) of a laser printer may be included.

(3) In the foregoing embodiment, the combination information 116a, 116b in which the function 118c is "print" and "fax" is registered in the command list 116 of the command administration server 110. Nevertheless, the combination information in which the function 118c is "ifax" and "upload" may also be registered in the command list 116. The combination information in which the function 118c is "upload" may include a protocol to be used upon uploading the attached file in addition to the destination 118d.

(4) In the foregoing embodiment, if the command area 208 is not included in the electronic mail 200, the supplying unit 36 of the multi-function device 10 supplies the images described by the attached files 210 to 216 included in the electronic mail 200 to the print performing unit 14. Nevertheless, if an attached file that is not designated with the command information is included, the supplying unit 36 may also supply the image described by such attached file to the print performing unit 14.

(5) The permitting unit 42 of the multi-function device 10 may also permit the user to input an arbitrary text. For example, the permitting unit 42 may display a message display screen on the displaying unit 48 of the multi-function device 10. In the foregoing case, by operating the operating unit 12 of the multi-function device 10, the user may be permitted to input the text.

(6) In the foregoing embodiment, the transferring unit 40 of the multi-function device 10 transfers the electronic mail 200 from the first mail folder 96 to the second mail folder 98 (S64 of FIG. 3) after the multi-function device 10 performs the processes to all attached files 210 to 216 attached to the electronic mail 200 (NO at S38 and S40 of FIG. 3). Nevertheless, the transferring unit 40 may also transfer the electronic mail 200 from the first mail folder 96 to the second mail folder 98 when the receiving unit 30 of the multi-function device 10 receives the electronic mail 200, and the electronic mail 200 may be transferred at a prescribed timing (e.g., upon reading the body area 204 (S34 of FIG. 3)) after the receiving unit 30 receives the electronic mail 200. According to the foregoing configuration, the multi-function device 10 may sort the electronic mails that it did not receive and the electronic mails that it received in different folders and store them in the mail server 90.

(7) In the foregoing embodiment, the supplying unit 36 of the multi-function device 10 supplies the print data corresponding to the text described in the sender inputting area 206 to the print performing unit 14 of the multi-function device 10 when the sender inputting area 206 is included in the body area 204 of the received electronic mail 200 (S34 of FIG. 3). Nevertheless, the supplying unit 36 may also permit the user of the multi-function device 10 to select whether to print the text described in the sender inputting area 206 when the sender inputting area 206 is included in the body area 204. In the foregoing case, if the user selects to print the text described in the sender inputting area 206, the supplying unit 36 may supply the print data corresponding to the text described in the sender inputting area 206 to the print performing unit 14 of the multi-function device 10.

(8) In the foregoing embodiment, respective units 30 to 46 are realized as a result of the controlling unit 28 performing the processes according to the program 26. Nevertheless, at least one unit of the respective units 30 to 46 may alternately be realized by a hardware resource such as a logic circuit.

The invention claimed is:

1. A multi-function device comprising an electronic mail communication function and a print function, the multi-function device comprising:
   one or more processors; and
   a memory that stores computer-readable instructions therein, the computer-readable instructions, when executed by the one or more processors, instructing the multi-function device to perform processes comprising:
      receiving a first electronic mail including a first attached file;
      determining whether the first electronic mail includes first command information, which includes a first sort of command and first designation information designating the first attached file;
      supplying an image described by the first attached file to a print performing unit in response to determining that the first electronic mail includes the first command information;
      determining whether the first electronic mail includes second command information, which includes a second sort of command different from the first sort of command and the first designation information;
      sending the first attached file to an other device in response to determining that the first electronic mail includes the second command information; and
      supplying the image described by the first attached file to the print performing unit in response to determining that the first electronic mail does not include at least one command information from a plurality of command information including the first command information and the second command information,
   wherein the multi-function device is configured to communicate with an administration server storing a command for the multi-function device, and wherein the computer-readable instructions, when executed by the one or more processors, instruct the multi-function device to perform processes further comprising:
- determining whether the first electronic mail includes fifth command information, which includes a third sort of command and the first designation information;
- acquiring a particular command from the administration server in response to determining that the first electronic mail includes the fifth command information;
- supplying the image described by the first attached file to the print performing unit when the particular command indicates the first sort of command; and
- sending the first attached file to a further device when the particular command indicates the second sort of command.

2. The multi-function device as in claim 1,
wherein the second command information further includes destination information, and
wherein sending the first attached file to the other device comprises:
- sending the first attached file to the other device, which corresponds to the destination information, in response to receiving the second command information, which further includes the destination information.

3. The multi-function device as in claim 1,
wherein the first electronic mail further includes a second attached file, and
wherein the computer-readable instructions, when executed by the one or more processors, instruct the multi-function device to perform processes further comprising:
- determining whether the first electronic mail includes third command information, which includes the first sort of command and second designation information designating the second attached file;
- supplying an image described by the second attached file to the print performing unit in response to determining that the first electronic mail includes the third command information;
- determining whether the first electronic mail includes fourth command information, which includes the second sort of command and the second designation information; and
- sending the second attached file to a particular device in response to determining that the first electronic mail includes the fourth command information.

4. The multi-function device as in claim 1,
wherein the administration server is configured to store, for each command of a plurality of commands, an association of each command and identification information for identifying each command,
wherein the fifth command information further includes particular identification information, and
wherein acquiring the particular command from the administration server comprises:
- acquiring, from the administration server, the particular command, which is associated with the particular identification information, by sending the particular identification information to the administration server.

5. The multi-function device as in claim 1,
wherein the first electronic mail includes a body area including a sender inputting area in which a text input by the sender of the first electronic mail is described and a command area in which particular command information is described, and
wherein the computer-readable instructions, when executed by the one or more processors, instruct the multi-function device to perform processes further comprising:
- supplying data corresponding to the text described in the sender inputting area to the print performing unit and without supplying data corresponding to the command information described in the command area to the print performing unit.

6. The multi-function device as in claim 1,
wherein the multi-function device is configured to communicate with a mail server storing the first electronic mail,
wherein receiving the first electronic mail comprises receiving the first electronic mail from a first folder of the mail server, and
wherein the computer-readable instructions, when executed by the one or more processors, instruct the multi-function device to perform processes further comprising:
- transferring the first electronic mail from the first folder of the mail server to a second folder of the mail server.

7. The multi-function device as in claim 1, wherein the computer-readable instructions, when executed by the one or more processors, instruct the multi-function device to perform processes further comprising:
- permitting selection of a file, selection of a process for the selected file, and input of a destination;
- generating a second electronic mail in response to a selection of a particular file and a particular process, the second electronic mail including the particular file as an attached file and sixth command information, which includes a command corresponding to the particular process and particular designation information designating the particular file; and
- sending the second electronic mail to a device corresponding to the destination.

8. The multi-function device as in claim 7, wherein the computer-readable instructions, when executed by the one or more processors, instruct the multi-function device to perform processes further comprising:
- generating a third electronic mail, which includes the particular file as the attached file and seventh command information including the first sort of command and the particular designation information, in response to the selection of the particular file without the selection of the particular process, and
- sending the third electronic mail to a device corresponding to the destination.

* * * * *